United States Patent Office 3,338,893
Patented Aug. 29, 1967

3,338,893
FUSED HALOCYCLOPROPYL STEROIDS
Colin C. Beard, Boulder, Colo., and Alexander D. Cross, Mexico City, Mexico, assignors to Syntex Corporation, Panama, Panama, a corporation of Panama
No Drawing. Filed Oct. 22, 1965, Ser. No. 502,376
16 Claims. (Cl. 260—239.55)

This is a continuation in part of application Serial No. 486,226, filed September 9, 1965.

This invention pertains to novel steroids, in particular to pregnanes and 19-norpregnanes having a cyclopropyl or halocyclopropyl ring fused to the 1- and 2-positions of the molecule. Specifically the invention is directed at compounds which are diagrammatically represented by the formula:

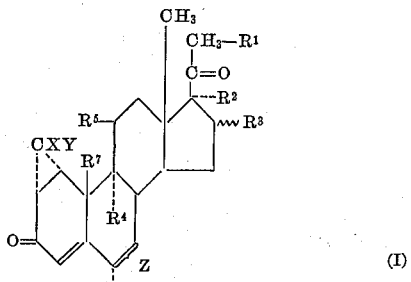

wherein $R^1$ is hydrogen, hydroxy, fluoro, chloro, phosphato, tetrahydropyranyloxy, a hydrocarbon carboxylic acyloxy group of less than 12 carbon atoms, or when taken together with $R^2$ the group

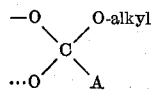

or

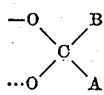

in which A is hydrogen or alkyl or up to 8 carbon atoms and B is hydrogen, or alkyl or acyl of up to 8 carbon atoms; $R^2$ is hydrogen, hydroxy, hydrocarbon carboxylic acyloxy group of less than 12 carbon atoms or when taken together with $R^3$ the group

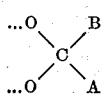

$R^3$ is hydrogen, methylene, α-methyl, β-methyl, α-chloro, α-fluoro, α-hydroxy or an α-hydrocarbon carboxylic acyloxy group of less than 12 carbon atoms; $R^4$ is hydrogen, chloro or fluoro; $R^5$ is hydrogen, hydroxy, keto or chloro, $R^4$ and $R^5$ being the same when $R^5$ is hydrogen or chloro; $R^6$ is hydrogen, methyl, chloro or fluoro; $R^7$ is hydrogen or methyl; Z is a carbon-carbon single bond or a carbon-carbon double bond; and each of X and Y are hydrogen, chloro or fluoro.

The hydrocarbon carboxylic acyl and acyloxy groups of the present invention will contain less than 12 carbon atoms and may be of a straight, branched, cyclic, or cyclic-aliphatic chain structure which is saturated, unsaturated, or aromatic and optionally substituted, by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t - butylacetate, phenoxyacetate, cyclopentylpropionate, aminoacetate, β-chloropropionate, adamantoate, and the like.

The foregoing compounds demonstrate hormonal properties characterized by corticoid, antiinflammatory and progestational activities. In particular, those compounds of Formula (I) wherein $R^1$, $R^4$ and $R^5$ are all hydrogen are progestational agents which are useful in fertility control and in the management of various menstrual disorders. Such compounds also possess antiandrogenic, antigonadotrophic and antiestrogenic activities. A preferred class of these compounds may be diagrammatically represented by the formula:

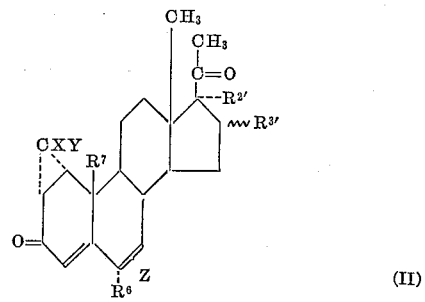

wherein X, Y, Z, $R^6$ and $R^7$ are as defined above; $R^{2'}$ is hydrogen, hydroxy or a hydrocarbon carboxylic acyloxy group; and $R^{3'}$ is hydrogen, methylene or α-methyl.

Those compounds of Formula (I) wherein at least one of $R^1$ and $R^5$ is other than hydrogen demonstrate corticoid and antiinflammatory activities and are useful in the treatment of conditions such as contact dermatitis, allergies, and the like which are usually responsive to such agents. A preferred class of these compounds may be diagrammatically represented by the formula:

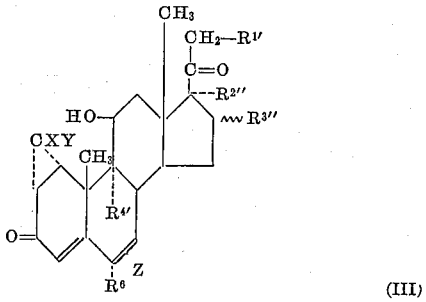

wherein X, Y, Z and $R^6$ are as defined above; $R^{1'}$ is hydroxy or a hydrocarbon carboxylic acyloxy group; $R^{2''}$ is hydrogen, hydroxy or taken together with $R^{3''}$ the group

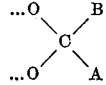

A and B being as previously defined; $R^{3''}$ is hydrogen, α-methyl, β-methyl or hydroxy; and $R^{4'}$ is hydrogen or fluoro.

The synthesis of these compounds may be accomplished in a number of ways. For those compounds in which at least one of X and Y is chloro or fluoro, a 3-keto-Δ$^1$-pregnene or a 3-keto-19-nor-Δ$^1$-pregnene is treated with an alkali metal or alkaline earth metal salt of an acid of the formula W—CXY—COOH, in which W is chloro, bromo or iodo and X and Y are as above defined save that one of X and Y is chloro or fluoro. The process is conducted at a temperature above that at which the salt decomposes, as evidenced by the evolution of carbon dioxide, and in the presence of an inert, anhydrous, polar organic solvent such as dimethyl triethylene glycol ether, s-dimethoxyethane, dimethyl diethylene glycol ether, and the like. In practice, it is also desirable to protect hydroxy groups through the utilization of derivatives which are easily convertible to hydroxy groups such as esters, tetrahydropyranyl ethers or ketones. This preference is not an absolute necessity however, for while free hydroxy groups will often become involved in side reactions under the conditions of the process, they can be readily regenerated by utilization of a mild alkaline hydrolysis after completion of the principal reaction.

In the case where both X and Y are hydrogen, a 1α,2α-chloromethylene or 1α,2α-dichloromethylene compound of the present invention is reductively dehalogenated as with lithium aluminum hydride. Such a dehalogenation is followed by an oxidation to regenerate keto groups, which when unprotected are reduced during the treatment with lithium aluminum hydride. Thus for example a 3-keto-1α,2α-dichloromethylenepregnane is first reductively dehalogenated to a 3-hydroxy-1α,2α-methylenepregnane which upon oxidation yields the 3-keto-1α,2α-methylpregnane.

Alternatively compounds wherein both X and Y are hydrogen are directly generated by the action of dimethylsulfoxonium methylide in dimethylsulfoxide on a 3-keto-$\Delta^1$-pregnene. When utilizing this reagent, it is preferable to protect free hydroxy groups, either through oxidation to a keto group which may be reduced back to a hydroxy group at a later stage or through formation of an acetate ester or tetrahydropyranyl ether. When not protected, a one equivalent excess of reagent should be employed for each free hydroxy group.

With the above reagents, the orientation of the methylene group with respect to the carbon atoms in positions 1 and 2 is predominantly α. In some instances, notably when dimethylsulfoxonium methylide is used, some 1β,2β-isomer is obtained. This may be readily separated as by chromatography, and analogously subjected to the process hereafter described.

Utilizing the above methods, a $\Delta^1$-pregnene or 19-nor-$\Delta^1$-pregnene of Formula (IV) is converted to the corresponding 1α,2α-methylene or 1α,2α-halomethylene derivative of Formula (V). Upon bromination, as with bromine in glacial acetic acid, followed by dehydrobromination, as with calcium carbonate in dimethylformamide, there is obtained the 1α,2α-methylene- or 1α,2α-halomethylene-3-keto-$\Delta^4$-ene of Formula (VI). Cleavage of the bis methylenedioxy protecting group, as with formic acid or hydrofluoric acid, then yields the 1α,2α-methylene or 1α,2α-halomethylene - 3,20-diketo-17α,21-dihydroxy-$\Delta^4$-pregnene or 19-nor-$\Delta^4$-pregnene of Formula (VII).

In the foregoing scheme $R^4$, $R^5$ and $R^7$ are as above defined. $R^{3'}$ is the same as $R^3$ with the exception of methylene which is excluded. Preferably a 16α-hydroxy group is protected as through formation of its acetate and regenerated through a subsequent alkaline hydrolysis. $R^{6'}$ is hydrogen or methyl.

Introduction of the $\Delta^{4,6}$-diene system may be realized through the treatment of the 3-keto-$\Delta^4$-ene of Formula (VI) with ethyl orthoformate in the presence of an acid such as p-toluenesulfonic acid or 2,4-dinitrobenzene sulfonic acid, to form the corresponding enol ether and treatment of this enol ether with 2,3-dichloro-5,6-dicyanobenzoquinone, the bis methylenedioxy group being cleaved in the conventional manner as described above. Alternatively the 3-keto-$\Delta^{4,6}$-diene system may be obtained through treating the enol ether of Formula (VII) herein $R^{6'}$ is hydrogen with N-bromosuccinimide and dehydrobrominating the resulting 6-bromo compound with calcium carbonate.

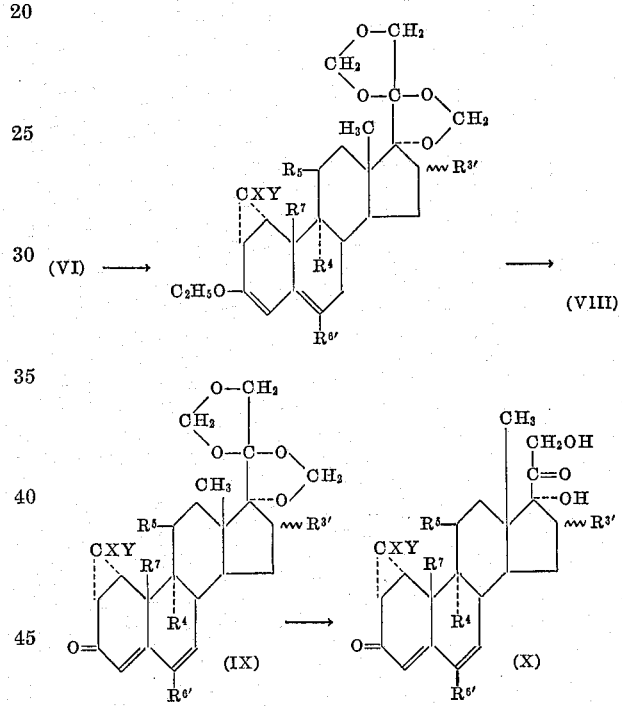

A 6-chloro or 6-fluoro substituent is introduced by treating the enol ether of Formula (VII) wherein $R^{6'}$ is hydrogen with N-chlorosuccinimide or perchloryl fluoride respectively, followed by treatment with acid to convert any 6β-isomer to the corresponding 6α-isomer. Regeneration of the enol ether and treatment with 2,3-dichloro-5,6-dicyanobenzoquinone in the manner described above furnishes the corresponding 6-chloro or 6-fluoro-$\Delta^{4,6}$-diene.

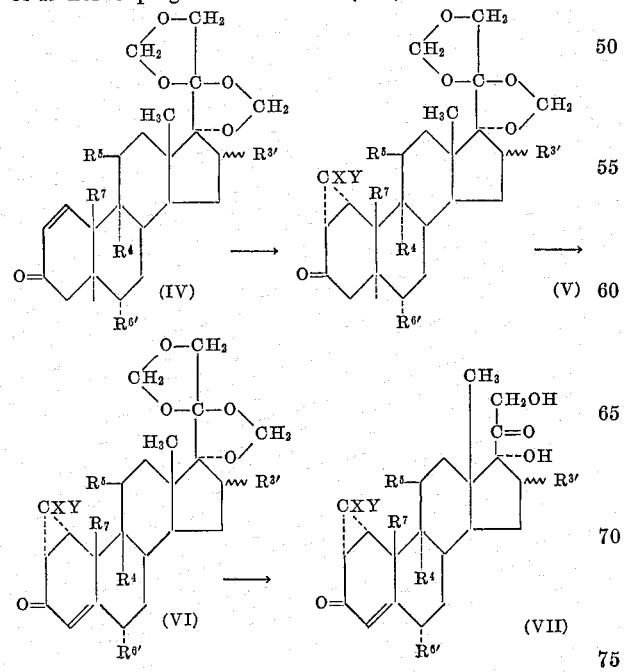

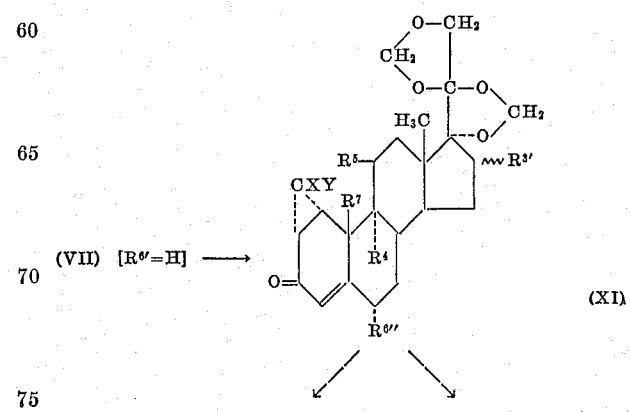

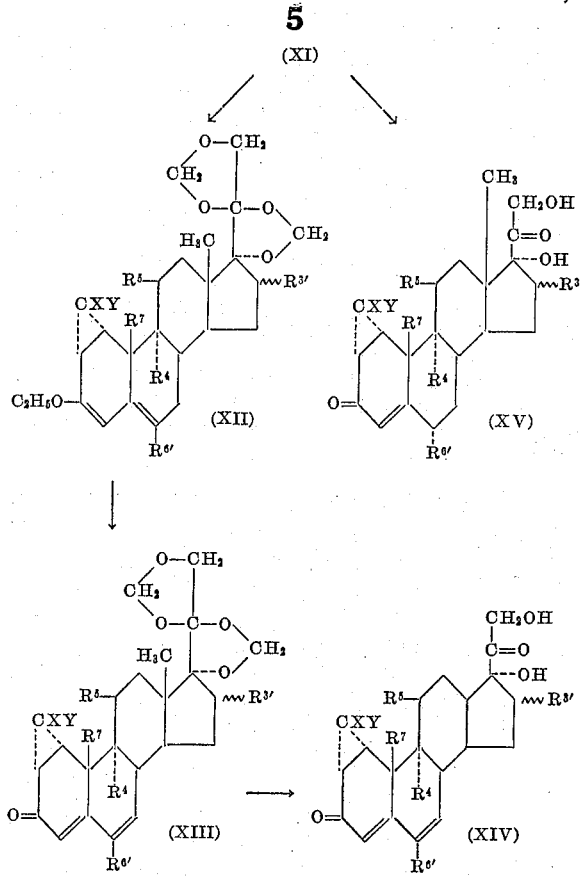

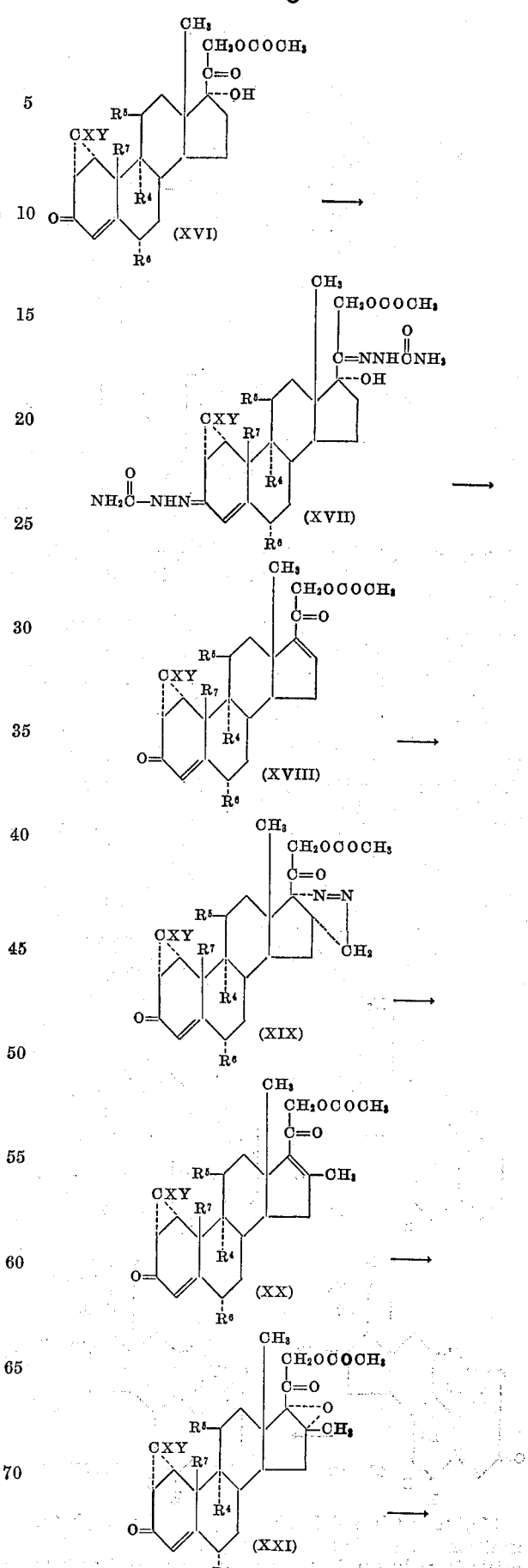

In the foregoing reaction scheme R⁶'' is chloro or fluoro.

Alternatively, a 6-chloro-Δ⁴,⁶-diene system may be generated through treatment of a 3-keto-Δ⁴,⁶-diene with chromyl chloride and subjecting the 6,7-chlorohydrin thus obtained to the action of hydrogen bromide in acetic acid.

The foregoing transformations may be performed on an 11-desoxy or 11-oxygenated intermediate. In the latter case, 9α-fluoro or 9α-chloro substituents may be initially present in the starting material or may be introduced at a subsequent stage in the synthesis via conventional method, e.g., dehydration of an 11β-hydroxy compound through the mesylate to yield the corresponding Δ⁹⁽¹¹⁾-ene; formation of the 9α,11β-bromohydrin as with perchloric acid and N-bromoacetamide with conversion to the 9β,11β-oxide through the use of potassium acetate; and treatment of this oxide with hydrogen halide.

Likewise the 9α,11β-dichloro group may be present in the starting material or may be introduced through treatment of a Δ⁹⁽¹¹⁾-ene with chlorine.

16-methylene compounds are prepared from compounds of Formulas (VII) or (XV) where R³' is hydrogen through 21-acylation with acetic anhydride in pyridine, formation of a 3,20-bis semicarbazone as through the action of semicarbazide hydrochloride on a 3,20-diketo compound, acetylation of the 17-hydroxy group with acetic anhydride and acetic acid, and treatment of this 17-acetoxy intermediate with pyruvic acid to generate a 3,20-diketo-Δ⁴,¹⁶-diene. This intermediate is allowed to react with diazomethane to form a 16α,17α,pyrazoline which upon pyrolysis yields a 3,20-diketo-16-methyl-Δ⁴,¹⁶-diene. Epoxidation as with perbenzoic acid or hydrogen peroxide, and opening of the oxide ring with hydrogen bromide in acetic acid, then furnishes the 16-methylene-17-hydroxy derivative as the 21-acetate which may be subjected to alkaline hydrolysis to yield the free 21-hydroxy compound. These reactions may be summarized as follows:

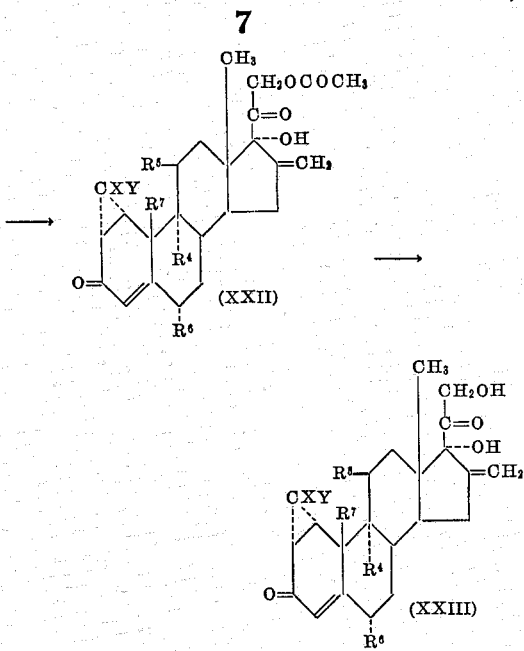

Introduction of the $\Delta^{4,6}$-diene system may then follow in the manner described above. Alternatively the enol ether of a compound having the structure of Formula XXIII in which $R^6$ is hydrogen, preferably as the 17α,20; 20,21-bis methylenedioxy derivative, may be treated with N-bromosuccinimide to form the corresponding 6-bromo compound. Dehydrobromination with calcium carbonate, then yields the 3-keto-$\Delta^{4,6}$-diene. This compound may be further utilized in the preparation of 3-keto-6-chloro-$\Delta^{4,6}$-diene derivatives; thus treatment with chromyl chloride and dehydration of the resultant 6,7-chlorohydrin with hydrogen chloride in acetic acid yields the corresponding 3-keto-6-chloro-$\Delta^{4,6}$-diene.

17-desoxy derivatives of the present invention are prepared by refluxing a 17α,21-dihydroxy compound in methanolic hydrochloric acid. The resulting 17α-desoxy-20-keto-21-dimethoxy derivative is then hydrolyzed in acidic aqueous dioxane to the corresponding 20-keto-21-aldehyde which under mild reductive conditions, such as sodium borohydride in aqueous methanol, at room temperature yields the 20-keto-21-hydroxy derivative.

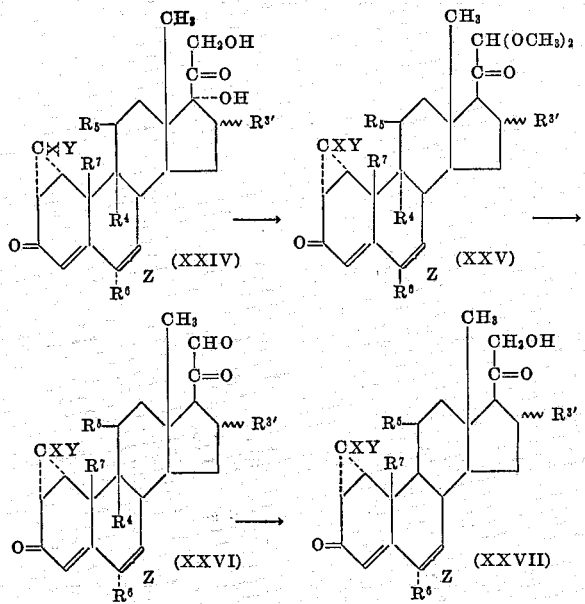

16α,17α-acetals and ketals are prepared through the treatment of a 16α,17α-dihydroxy compound with an aldehyde or ketone in the presence of an acid such as perchloric acid. The resulting acetal or ketal, e.g., a 16α,17α-isopropylidenedioxy derivative, may be utilized as a final compound or as an intermediate, the group being cleaved with regeneration of the 16α,17α-diol system by the action of hydrofluoric acid.

17α,21-orthoesters, herein designated as 17α,21-(1-alkoxyalk-1,1-ylidenedioxy) derivatives, are obtained through the action of a lower alkyl orthoester on a 17,21-dihydroxy compound. Thus by the use of methyl orthocaproate there is formed a corresponding 17α,21-(1-methoxyhex-1,1-ylidenedioxy) derivative.

These 17a,21-orthoesters, upon treatment with hydrochloric acid at room temperature or upon warming with oxalic acid are cleaved to yield a 17α-acylate. For example, a 17a,21-(1-methoxypent-1,1-ylidenedioxy) derivative, obtained through the use of methyl orthovalerate on a 17α,21-diol, yields upon treatment with hydrochloric acid the corresponding 17α-pentanoyloxy-21-hydroxy derivative.

17α,21-ketals or acetals are prepared through the treatment of a 17α,21-dihydroxy compound with a ketone or aldehyde in the presence of an acid catalyst such as perchloric acid with protection of a 16α-hydroxy, when present, through prior acetylation.

The 21-hydroxy compounds of the present invention may be esterified according to conventional procedures such as allowing the alcohol to stand overnight and at room temperature with the appropriate acyl chloride or acid anhydride in pyridine. In the case of the 17α hydroxy group, the alcohol is esterified by allowing it to stand with the acid anhydride and corresponding acid, under anhydrous conditions and in the presence of a catalytic amount of a strong acid, such as p-toluenesulfonic acid.

Formation of 21-tetrahydropyranyl ethers may be realized by treating the free 21-hydroxy compound with dihydropyran, under anhydrous conditions, in the presence of an acidic catalyst such as p-toluenesulfonic acid, boron trifluoride etherate, etc., and at a temperature of from about 25° C. to about 50° C.

21-fluoro, 21-chloro, 21-phosphato and 21-unsubstituted derivatives of the present invention are obtained through treatment of the corresponding 21-hydroxy compounds with methanesulfonyl chloride and conversion of the resulting mesylate ester to the corresponding 21-iodo intermediate by the action of sodium iodide. The 21-iodo intermediate, upon the action of silver phosphate and phosphoric acid, silver fluoride or silver chloride, yields the corresponding 21-phosphato, 21-fluoro, or 21-chloro compound respectively. Alternatively, treatment of the 21-iodo intermediate with sodium metabisulfite yields the 21-unsubstituted compound. Treatment of this same 21-iodo intermediate with potassium acetate or an alkali metal salt of another hydrocarbon carboxylic acid produces the corresponding 21-acyloxy derivative.

The starting materials for the present invention, represented by Formula (IV), are obtained from the corresponding 3-keto-$\Delta^4$-pregnene through reduction with lithium in liquid ammonia followed by oxidation, as with chromium trioxide to yield a 3-keto-5α-pregnane, which is then brominated as with bromine in acetic acid, and dehydrobromination with calcium carbonate to yield the requisite 3-keto-$\Delta^1$-pregnene.

The following examples will serve to further typify the nature of the present invention but should not be constituted as a limitation thereof.

*Example 1*

To a solution of 5 g. of $\Delta^4$-pregnene-11β,17α,21-triol-3,20-dione, in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 17α,20;20,21-bis methylenedioxy-Δ⁴-pregnen-11β-ol-3-one which is recrystallized from methanol:ether.

To a solution of 1 g. of 17α,20;20,21-bis methylenedioxy-Δ⁴-pregnen-11β-ol-3-one in 75 ml. of tetrohydrofuran and 125 ml. of liquid ammonia is added over a 20-minute period 0.27 g. of lithium. The mixture is refluxed with stirring for 2½ hours and its color then discharged by the careful addition of ethanol. The resulting solution is allowed to stand at room temperature until the ammonia has evaporated and the residue is next shaken with 100 ml. of 1:1 water:methylene chloride. The aqueous layer is separated and extracted with methylene chloride and the combined extracts and organic layer are dried over magnesium sulfate and evaporated. This residue is dissolved in 100 ml. of 5:9 methylene chloride: acetone and titrated with 8N chromic acid, maintaining a temperature of 25° C. Thirteen milliliters of water are then added with gentle shaking and the aqueous phase is separated and extracted with methylene chloride. The combined extracts and organic layer are dried over magnesium sulfate and evaporated to dryness to yield 17α,20;20,21-bis methylenedioxy-5α-pregnan-11β-ol-3-one which may be further purified through recrystallization from ether: hexane.

To a stirred solution of 1 g. of 17α,20;20,21-bis methylene-dioxy-5α-pregnan-11β-ol-3-one and 6.6 g. of p-toluenesulfonic acid in 300 ml. of glacial acetic acid is added, over a 10 minute period, a solution of 1.1 molar equivalent of bromine and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for 5 minutes. The reaction mixture is next poured into 1 liter of ice water and solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with 3:1 benzene:chloroform to yield 17α,20;20,21-bis methylenedioxy-Δ¹-5α-pregnan-11β-ol-3-one which may be recrystallized from cyclohexane:ethyl acetate.

A solution of 45 equivalents of sodium chlorodifluoroacetate in 50 ml. of dimethyl triethylene glycol ether is added in a dropwise fashion to a refluxing solution of 17α,20;20,21-bis methylenedioxy-Δ¹-5α-pregnan-11β-ol-3-one in 10 ml. of dimethyl triethylene glycol ether. Refluxing is discontinued upon the absence of any change in the U.V. spectra and the mixture is then filtered and evaporated to dryness under reduced pressure. The residue is then heated at reflux for one hour with a 1% methanolic solution of potassium hydroxide. At the end of this time, the reaction mixture is neutralized with dilute hydrochloric acid and evaporated to dryness. The residue is then chromatographed on alumina with methylene chloride to yield 1α,2α-difluoromethylene-17α,20;20,21-bis methylenedioxy-5α-pregnan-11β-ol-3-one.

To a stirred solution of 1 g. of 1α,2α-difluoromethylene-17α,20;20,21-bis methylenedioxy-5α-pregnan-11β-ol-3-one and 6.6 g. of p-toluenesulfonic acid in 330 ml. of glacial acetic acid is added, over a 10 minute period, a solution of 1.1 molar equivalent of bromine and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for 5 minutes. The reaction mixture is next poured into 1 liter of ice water and solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with 3:1 benzene:chloroform to yield 1α,2α-difluoromethylene-17α,20;20,21-bis methylenedioxy-Δ⁴-pregnen-11β-ol-3-one which may be recrystallized from cyclohexane:ethyl acetate.

A suspension of 1 g. of 1α,2α-difluoromethylene-17α,20;20,21-bis methylenedioxy - Δ⁴ - pregnen - 11β-ol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 1α,2α-difluoromethylene-Δ⁴-pregnene-11β,17α,21-triol-3,20-dione which may be further purified through recrystallization from isopropanol.

In a similar fashion the following compounds are obtained by employing the correspondingly substituted starting materials in place of Δ⁴-pregnene-11β,17α,21-triol-3,20-dione:

1α,2α-difluoromethylene-16α-methyl-Δ⁴-pregnene-11β,17α,21-triol-3,20-dione;
1α,2α-difluoromethylene-16β-methyl-Δ⁴-pregnene-11β,17α,21-triol-3,20-dione;
1α,2α-difluoromethylene-6α-fluoro-Δ⁴-pregnene-11β,17α,21-triol-3,20-dione;
1α,2α-difluoromethylene-6α,9α-difluoro-Δ⁴-pregnene-11β,17α,21-triol-3,20-dione;
1α,2α-difluoromethylene-6α-fluoro-16α-methyl-Δ⁴-pregnene-11β,17α,21-triol-3-20-dione;
1α,2α-difluoromethylene-6α,9α-difluoro-16α-methyl-Δ⁴-pregnene-11β,17α,21-triol-3,20-dione;
1α,2α-difluoromethylene-6α-fluoro-16β-methyl-Δ⁴-pregnene-11β,17α,21-triol-3,20-dione;
1α,2α-difluoromethylene-9α-fluoro-16β-methyl-Δ⁴-pregnene-11β,17α,21-triol-3,20-dione;
1α,2α-difluoromethylene-6α,9α-difluoro-16β-methyl-Δ⁴-pregnene-11β,17α,21-triol-3,20-dione;
1α,2α-difluoromethylene-Δ⁴-pregnene-17α,21-diol-3,20-dione;
1α,2α-difluoromethylene-6α-methyl-Δ⁴-pregnene-11β,17α,21-triol-3,20-dione;
1α,2α-difluoromethylene-Δ⁴-pregnene-17α,21-diol-3,11,20-trione;
1α,2α-difluoromethylene-6α,16α-dimethyl-Δ⁴-pregnen-11β,17α,21-triol-3,20-dione;
1α,2α-difluoromethylene-9α-fluoro-16α-methyl-Δ⁴-pregnene-11β,17α,21-triol-3,20-dione;
1α,2α-difluoromethylene-9α-fluoro-6α,16α-dimethyl-Δ⁴-pregnene-11β,17α,21-triol-3,20-dione;
1α,2α-difluoromethylene-9α-fluoro-Δ⁴-pregnene-11β,17α,21-triol-3,20-dione;
1α,2α-difluoromethylene-16α-fluoro-Δ⁴-pregnene-11β,17α,21-triol-3,20-dione;
1α2α-difluoromethylene-9α,16α-difluoro-Δ⁴-pregnene-11β,17α,21-triol-3,20-dione;
1α,2α-difluoromethylene-16α-chloro-Δ⁴-pregnene-11β,17α,21-triol-3,20-dione;
1α,2α-difluoromethylene-9α-fluoro-16α-chloro-Δ⁴-pregene-11β,17α,21-triol-3,20-dione; and
1α,2α-difluoromethylene-16α-methyl-Δ⁴-pregnene-11β,17α,21-triol-3,20-dione.

The 16α-chloro and 16α-fluoro starting materials employed for the above may be obtained in the following manner. 20,21 - oxido - $\Delta^{4,16}$ - pregnadien-11β-ol-3-one is treated with hydrogen fluoride and then acetic anhydride in the manner described by Magerlein et al., J. Med. Chem., 7, 748 (1964) to yield 16α-fluoro-21-acetoxy-$\Delta^{4,17(20)}$ pregnadien-11β-ol-3-one, or with hydrogen chloride and then acetic acid in the manner of Kagan et al., J. Med. Chem., 7, 751 (1964) to yield 16α-chloro-21-acetoxy-$\Delta^{4,17(20)}$-pregnadien-11β-ol-3-one. Each of these compounds is then oxidized with osmium tetroxide and N-methylmorpholine oxide-hydrogen peroxide, as described in both of these references, to yield 16α-fluoro-21-acetoxy - $\Delta^4$ - pregnene-11β,17α-diol-3,20-dione and 16α-chloro - 21-acetoxy-$\Delta^4$-pregnene-11β,17α-diol-3,20-dione, which are hydrolyzed with base to yield the free 21-hydroxy compounds used in forming the bis methylenedioxy starting materials.

The foregoing 9α-halo compounds may be prepared via the following alternative route:

One gram of 1α,2α-difluoromethylene-17α,20;20,21-bis methylenedioxy-$\Delta^4$-pregnen-11β-ol-3-one is dissolved with slow heating in 12.5 ml. of dimethylformamide. To the cooled mixture is then added 0.42 g. of methanesulfonyl chloride and 0.5 ml. of pyridine. After heating the reaction mixture at 80° C. for 30 minutes, it is cooled, diluted with water and extracted with ethyl acetate. The extracts are washed with water, dried over sodium sulfate and evaporated to yield 1α,2α-difluoromethylene-17α,20;20,21-bis methylenedioxy - $\Delta^{4,9(11)}$ - pregnadiene-3-one which may be further purified by recrystallization from acetone:hexane. Twenty-eight grams of N-bromoacetamide are added over a one hour period with stirring in the dark and at room temperature, to a mixture of 50 g. of 1α,2α-difluoromethylene-17α,20;20,21-bis methylenedioxy-$\Delta^{4,9(11)}$-pregnadien-3-one, 500 ml. of pure dioxane and 8 ml. of 0.4N perchloric acid. The reaction mixture is stirred for an additional hour and a solution of 10% sodium sulfite is then added until negative to potassium-starch indicator paper. Ice is added and the mixture extracted with chloroform. These extracts are washed consecutively with water, 5% aqueous sodium bicarbonate solution and water, and the solvent then removed by distillation in vacuo. The residue is triturated with acetone to yield the bromohydrin intermediate. A mixture of 20 g. of anhydrous potassium acetate and 200 ml. of acetone is heated almost to boiling and a solution of 17 g. of the bromohydrin intermediate in 200 ml. of acetone is then slowly added with stirring. The mixture is refluxed for 10 hours, cooled and almost all of the acetone is removed by distillation. Iced water is then added and the solid which forms collected by filtration, washed with water and dried, to yield 1α,2α-difluoromethylene-9β,11β-oxido-17α,20;20,21-bis methylenedioxy-$\Delta^4$-pregnen-3-one which may be further purified through recrystallization from methylene chloride:benzene. To a stirred solution of 1.8 g. of 1α,2α-difluoromethylene-9β,11β-oxido-17α,20;20,21-bis methylenedioxy-$\Delta^4$-pregnen-3-one in 30 ml. of methylene chloride, cooled to 0° C., is added a cooled solution (−70° C.) of 2.11 g. of anhydrous hydrogen fluoride in 3.7 ml. of tetrahydrofuran over a period of 20 minutes. The mixture is stirred at a temperature below 10° C. for 6 hours and then neutralized by the cautious addition of 5% aqueous sodium bicarbonate solution. The organic layer is separated, washed with water, dried over sodium sulfate and concentrated until solid forms. The cooled mixture is then filtered and the solid dissolved in hot ethyl acetate. This solution is filtered hot and then cooled and the solid which forms collected by filtration to yield 1α,2α-difluoromethylene-9α-fluoro-17α,20;20,21-bis methylenedioxy-$\Delta^4$-pregnen-11β-ol-3-one which is converted to 1α,2α-difluoromethylene-9α-fluoro - $\Delta^4$-pregnen-11β,17α,21-triol-3,20-dione through the action of hydrofluoric acid as previously described. Use of hydrogen chloride in place of hydrogen fluoride in the foregoing procedure yields the corresponding 9α-chloro-11β-hydroxy compounds.

The foregoing 6α-fluoro compounds may alternatively be prepared according to the following procedure.

To a suspension of 1 g. of 1α,2α-difluoromethylene-17α,20;20,21-bis methylenedioxy-$\Delta^4$ - pregnene-3,11-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 1α,2α-difluoromethylene-3-ethoxy-17α,20;20,21-bis methylenedioxy - $\Delta^{3,5(6)}$ - pregnadien-11-one which is recrystallized from acetone:hexane. A stream of perchloryl fluoride is passed through a solution of 1 g. of 1α,2α-difluoromethylene-3-ethoxy-17α,20;20,21-bis methylenedioxy-$\Delta^{3,5(6)}$-pregnadien-11-one in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromoatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed with water and dried to yield 1α,2α-difluoromethylene-6α-fluoro-17α,20;20,21-bis methylene dioxy-$\Delta^4$-pregnene-3,11-dione which is recrystallized from acetone:hexane. A solution of 2 g. of sodium borohydride in 30 ml. of methanol is added with stirring to a solution of 2 g. of 1α,2α-difluoromethylene-6α-fluoro-17α,20;20,21-bis methylenedioxy-$\Delta^4$-pregnene-3,11-dione in 40 ml. of tetrahydrofuran. The mixture is allowed to stand at room temperature for 15 hours and the excess reagent is then decomposed by the addition of acetic acid. The mixture is next concentrated to small volume under reduced pressure, diluted with water and extracted with ethyl acetate. These extracts are washed with water, dried and evaporated to yield 1α,2α-difluoromethylene-6α-fluoro-17α,20;20,21-bis methylenedioxy - $\Delta^4$ - pregnene-3,11-diol which is further purified through recrystallization from acetone:hexane. A mixture of 1 g. of 1α,2α-difluoromethylene - 6α-fluoro-17α,20;20,21-bis methylenedioxy-$\Delta^4$-pregnene-3,11-diol in 20 ml. of dioxane, and 1.1 molar equivalents of 2,3-dichloro-5,6-dicyano-1,4-benzoquinone is allowed to stand at room temperature for 3 hours. The solid formed during the reaction is removed by filtration and the filtrate evaporated to dryness. The residue is dissolved in acetone and filtered through 20 g. of alumina to yield 1α,2α-difluoromethylene-6α-fluoro-17α,20;20,21-bis methylenedioxy-$\Delta^4$ pregnen-11β-ol-3-one which may be further purified by recrystallization from acetone:hexane and converted to 1α,2α-difluoromethylene-6α-fluoro-$\Delta^4$-pregnen-11β,17α,21-triol-3,20-dione with hydrofluoric acid as previously described.

*Example 2*

To a solution of 5 g. of $\Delta^4$-pregnene-11β,16α,17α,21-tetrol-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 17α,20;20,21-bis methylenedioxy-$\Delta^4$-pregnene-11β,16α-diol-3-one which is recrystallized from methanol:ether.

A mixture of 1 g. of 17α,20;20,21-bis methylenedioxy-Δ⁴-pregnene-11β,16α-diol-3-one, 4 ml. of pyridine and 2 ml. of acetic anhydride is allowed to stand at room temperature for 15 hours. The mixture is then poured into ice water and the solid which forms is collected by filtration, washed with water and dried to yield 16α-acetoxy-17α,20;20,21-bis methylenedioxy-Δ⁴-pregnen-11β-ol-3-one which may be further purified through recrystallization from acetone:hexane.

To a solution of 1 g. of 16α-acetoxy-17α,20;20,21-bis methylenedixoy-Δ⁴-pregnen-11β-ol-3-one in 75 ml. of tetrahydrofuran and 125 ml. of liquid ammonia is added over a 20-minute period 0.27 g. of lithium. The mixture is refluxed with stirring for 2½ hours and its color then discharged by the careful addition of ethanol. The resulting solution is allowed to stand at room temperature until the ammonia has evaporated and the residue is next shaken with 100 ml. of 1:1 water:methylene chloride. The aqueous layer is separated and extracted with methylene chloride and the combined extracts and organic layer are dried over magnesium sulfate and evaporated. This residue is acetylated with one equivalent of acetic anhydride as described above and after chromatography the 16-monoacetate thus obtained is dissolved in 100 ml. of 5:9 methylene chloride:acetone and titrated with 8 N chromic acid, maintaining a temperature of 25° C. Thirteen milliliters of water are then added with gentle shaking and the aqueous phase is separated and extracted with methylene chloride. The combined extracts and organic layer are dried over magnesium sulfate and evaporated to dryness to yield 16α-acetoxy-17α,20;20,21-bis methylenedioxy-5α-pregnan-11β-ol-3-one which may be further purified through recrystallization from ether:hexane.

To a stirred solution of 1 g. of 16α-acetoxy-17α,20;20,21-bis methylenedioxy-5α-pregnan-11β-ol-3-one and 6.6 g. of p-toluenesulfonic acid in 330 ml. of glacial acetic acid is added, over a 10 minute period, a solution of 1.1 molar equivalent of bromine and 2.45 g. of sodium acetate in 110 ml. of glacial acetic acid. After stirring for an additional 10-minute period, a solution of 75 g. of sodium acetate in 150 ml. of glacial acetic acid is then continued at 20° C. for 5 minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the condition of 5 ml. of hexane, the mixture is filtered and the filtrate is evaporated to dryness. This residue is chromatographed on acid washed alumina with 3:1 benzene:chloroform to yield 16α-acetoxy-17α,20;20,21-bis methylenedioxy-Δ¹-5α-pregnen-11β-ol-3-one which may be recrystallized from cyclohexane:ethyl acetate.

A solution of 1 g. of 16α-acetoxy-17α,20;20,21-bis methylenedioxy-Δ¹-5α-pregnen-11β-ol-3-one in 15 ml. of dimethyl triethylene glycol ether, heated at reflux and under nitrogen, is treated in a dropwise fashion with a 50% w./v. solution of sodium chlorodifluoroacetate in dimethyl triethylene glycol ether. When, upon the addition of 5 equivalents of reagents no change is observed in the U.V. spectrum, the addition is stopped. The cooled solution is filtered and the filtrate then evaporated to dryness under reduced pressure. The residue is dissolved in methanol and treated with 0.5 g. of potassium carbonate. This mixture is heated at reflux for one hour, cooled and poured into ice water. The solid which forms is collected by filtration, washed well with water and dried. Chromatography of this residue on alumina, eluting with methylene chloride then yields as the major component 1α,2α-difluoromethylene-17α,20;20,21-bis methylenedioxy-5α-pregnane-11β,16α-diol-3-one.

To a stirred solution of 1 g. of 1α,2α-difluoromethylene-17α,20;20,21 - bis methylenedioxy-5α-pregnane-11β,16α-diol-3-one and 6.6 g. of p-toluenssulfonic acid in 330 ml. of glacial acetic acid is added, over a 10 minute period, a solution of 1.1 molar equivalent of bromine and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for 5 minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with 3:1 benzene:chloroform to yield 1α,2α-difluoromethylene - 17α,20;20,21 - bis methylenedioxy-Δ⁴-pregnene-11β,16α-diol-3-one which may be recrystallized from cyclohexane: ethyl acetate.

A suspension of 1 g. of 1α,2α-difluoromethylene-17α,20;20,21-bis methylenedioxy-Δ⁴-pregnene-11β,16α-diol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 1α,2α-difluoromethylene-Δ⁴-pregnene-11β,16β,17α,21-tetrol-3,20-dione which may be further purified through recrystallization from isopropanol.

To 120 ml. of acetone containing 1 g. of 1α,2α-difluoromethylene - Δ⁴-pregnene-11β,16α,17α,21-tetrol-3,20-dione are added 30 drops of 70% perchloric acid. The mixture is allowed to stand 1 hour at room temperature, 30 drops of pyridine are added and the solution is evaporated to dryness under reduced pressure. Thirty milliliters of water are added to the residue and this mixture is extracted several times with ethyl acetate. The combined extracts are washed to neutrality with water, dried over sodium sulfate and evaporated to dryness. The residue upon trituration with methanol yields 1α,2α-difluoromethylene - 16α,17α-isopropylidenedioxy-Δ⁴-pregnene-11β, 21-diol-3,20-dione which is recrystallized from methanol.

In a similar fashion the following compounds are obtained:

1α,2α-difluoromethylene-9α-fluoro-16α,17α-isoproplyidenedioxy-Δ⁴-pregnene-11β,21-diol-3,20-dione;
1α,2α-difluoromethylene-6α-methyl-16α,17α-isopropylidenedioxy-Δ⁴-pregnene-11β,21-diol-3,20-dione;
1α,2α-difluoromethylene-6α,9α-fluoro-16α,17αisopropylidenedioxy-Δ⁴-pregnene-11β,21-diol-3,20-dione;
1α,2α-difluoromethylene-6α-methyl-9α-fluoro-16α,17α-isopropylidenedioxy-Δ⁴-pregnene-11β,21-diol-3,20-dione; and
1α-2α-difluoromethylene-6α-fluoro-16α,17α-isopropylidenedioxy-Δ⁴-pregnene-11β,21-diol-3,20-dione.

*Example 3*

A mixture of 1 g. of 1α,2α-difluoromethylene-16α-17α-isopropylidenedioxy - Δ⁴ - pregnene - 11β,21-diol-2,20-dione, 4 ml. of pyridine and 2 ml. of acetic anhydride is allowed to stand at room temperature for 15 hours. The mixture is then poured into ice water and the solid which forms is collected by filtration, washed with water and dried to yield 1α,2α - difluoromethylene - 16α,17α-isopropylidenedioxy - 21 - acetoxy - Δ⁴ - pregnen-11β-ol-3,20-dione which may be further purified through recrystallization from acetone:hexane.

In a similar fashion, utilization of other anhydrides such as propropionic anhydride, or of other acylating agents such as acid chlorides yields the corresponding 21-acylate. Likewise other 21-hydroxy compounds of the present invention may be acylated according to the procedure of this example.

Example 4

A solution of 6 g. of 16α - acetoxy - 17α,20;20,21-bis methylenedioxy-Δ¹-5α-pregnen-11β-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 16α-acetoxy-17α,20;20,21-bis methylenedioxy - Δ¹ - 5α-pregnene-3,11-dione which may be further purified by recrystallization from acetone:hexane.

A solution of 1 g. of 16α - acetoxy - 17α,20;20,21-bis methylenedioxy - Δ¹-5α-pregnene-3,11-dione in 10 ml. of dimethylsulfoxide is added to a solution of one equivalent of dimethylsulfoxonium methylide in dimethylsulfoxide, prepared in the manner of Corey et al., J.A.C.S. 87, 1353 (1965). The mixture is stirred under nitrogen at room temperature for 20 hours and at 50° C. for 7 hours. One hundred milliliters of water are then added and the resulting mixture is extracted four times with 100 ml. portions of ethyl acetate. The combined extracts are washed with water and saturated aqueous sodium chloride solution, dried over sodium sulfate and evaporated to dryness. The residue is chromatographed on silica, eluting with 1:9 ether:methylene chloride to yield 1α,2α-methylene-16α - acetoxy - 17α,20;20,21 - bis methylenedioxy-5α-pregnane-3,11-dione.

To a stirred solution of 1 g. of 1α,2α - methylene-16α-acetoxy-17α,20;20,21-bis methylenedioxy - 5α - pregnane-3,11-dione and 6.6 g. of p-toluenesulfonic acid in 330 ml. of glacial acetic acid is added, over a 10 minute period, a solution of 1.1 molar equivalent of bromine and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for 5 minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with 3:1 benzene:chloroform to yield 1α,2α - methylene-16α - acetoxy - 17α,20;20,21 - bis methylenedioxy-Δ⁴-pregnene-2,11-dione which may be recrystallized from cyclohexane:ethyl acetate.

A suspension of 1 g. of 1α,2α - methylene - 16α-acetoxy - 17α,20;20,21-bis methylenedioxy - Δ⁴-pregnene-3,11-dione in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield 1α,2α-methylene - 17α,20;20,21-bis methylenedioxy-Δ⁴-pregnen-16α-ol-3,11-dione which is recrystallized from acetone:hexane.

A solution of 1 g. of sodium borohydride in 3 ml. of water is added to an ice-cooled solution of 1 g. of 1α,2α-methylene - 17α,20,20;21-bis methylenedioxy-Δ⁴-pregnen-16α-ol-3,11-dione in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 1α,2α-methylene - 17α,20;20,21 - bis methylenedioxy - Δ⁴-pregnene-3β,11β,16α - triol which may be further purified by recrystallization from acetone:hexane.

A mixture of 1 g. of 1α,2α - methylene - 17α,20;20,21-bis methylenedioxy - Δ⁴ - pregnene - 3β,11β,16α-triol in 20 ml. of dioxane, and 1.1 molar equivalents of 2,3-dichloro - 5,6 - dicyano-1,4-benzoquinone is allowed to stand at room temperature for 3 hours. The solid formed during the reaction is removed by filtration and the filtrate evaporated to dryness. The residue is dissolved in acetone and filtered through 20 g. of alumina to yield 1α,2α-methylene - 17α,20;20,21 - bis methylenedioxy - Δ⁴-pregnene-11β,16α-diol-3-one which may be further purified by recrystallization from acetone:hexane.

A suspension of 1 g. of 1α,2α-methylene-17α,20;20,21-bis methylenedioxy-Δ⁴-pregnene-11β,16α-diol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 1α,2α-methylene-Δ⁴-pregnene-11β,16α,17α,21-tetrol-3,20-dione which may be further purified through recrystallization from isopropanol.

To 120 ml. of acetone containing 1 g. of 1α,2α-methylene Δ⁴ - pregnene-11β,16α,17α,21-tetrol-3,20-dione are added 30 drops of 70% perchloric acid. The mixture is allowed to stand 1 hour at room temperature, 30 drops of pyridine are added and the solution is evaporated to dryness under reduced pressure. Thirty milliliters of water are added to the residue and this mixture is extracted several times with ethyl acetate. The combined extracts are washed to neutrality with water, dried over sodium sulfate and evaporated to dryness. The residue upon trituration with methanol yields 1α,2α,methylene-16α,17α-isopropylidenedioxy-Δ⁴-pregnene-11β,21-diol-3,20-dione which is recrystallized from methanol.

In a similar fashion, the following compounds are obtained:

1α,2α-methylene-9α-fluoro-16α,17α-isopropylidenedioxy-Δ⁴-pregnene-11β,17α-diol-3,20-dione;

1α,2α-methylene-6α-chloro-16α,17α-isopropylidenedioxy-Δ⁴-pregnene-11β,17α-diol-3,20-dione;

1α,2α-methylene-6α-fluoro-16α,17α-isopropylidenedioxy-Δ⁴-pregnene-11β,17α-diol-3,20-dione;

1α,2α-methylene-6α-methyl-16α,17α-isopropylidenedioxy-Δ⁴-pregnene-11β,17α-diol-3,20-dione;

1α,2α-methylene-6α,9α-difluoro-16α,17α-isopropylidenedioxy-Δ⁴-pregnene-11β,17α-diol-3,20-dione; and 1α,2α-methylene-6α-methyl-9α-fluoro-16α,17α-isopropylidenedioxy-Δ⁴-pregnene-11β,17α-diol-3,20-dione.

Example 5

A solution of 1 g. of 17α,20;20,21-bis methylenedioxy-Δ¹-5α-pregnene-11β-ol-3-one, obtained according to the methods described in Example 1, in 10 ml. of dimethylsulfoxide is added to a solution of two equivalents of dimethylsulfoxonium methylide. The mixture is stirred under nitrogen at 25° C. for 20 hours and at 50° C. for 7 hours. Two hundred milliliters of water are then added and the resulting mixture is extracted with ethyl acetate. The combined extracts are washed with water and saturated aqueous sodium chloride solution, dried over sodium sulfate and evaporated to dryness. The residue is refluxed for one hour in a mixture of 0.5 g. of potassium carbonate in 25 ml. of methanol and this mixture is then poured into water. The aqueous mixture is extracted with methylene chloride and these extracts are dried over sodium sulfate and evaporated to dryness. The residue is chromatographed on alumina eluting with 1:9 ether methylene chloride to yield as the major component 1α,2α-methylene-17α,20;20,21-bis methylenedioxy - 5α-pregnan-11β-ol-3-one.

To a stirred solution of 1 g. of 1α,2α-methylene-17α,20;20,21-bis methylenedioxy 5α-pregnan-11β-ol-3-one and 6.6 g. of p-toluenesulfonic acid in 330 ml. of glacial acetic acid is added, over a 10 minute period, a solution of 1.1 molar equivalent of bromide and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for 5 minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with benzene:chloroform to yield 1α,2α-methylene-17α,20;20,21-bis methylenedioxy - $\Delta^4$-pregnen-11β-ol-one which may be recrystallized from cyclohexane:ethyl acetate.

A suspension of 1 g. of 1α,2α-methylene-17α,20;20,21-bis methylenedioxy-$\Delta^4$-pregnen-11β-ol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 1α,2α-methylene-$\Delta^4$-pregnene-11β,17α-21-triol-3,20-dione which may be further purified through recrystallization from isopropanol.

The following compounds are obtained in a similar fashion:

1α,2α-methylene-6α-fluoro-$\Delta^4$-pregnene-11β,17α,21-triol-3,20-dione;
1α,2α-methylene-6α,9α-difluoro-$\Delta^4$-pregnene-11β,17α,21-triol-3,20-dione;
1α,2α-methylene-6α-fluoro-16α-methyl-$\Delta^4$-pregnene-11β,17α,21-triol-3,20-dione;
1α,2α-methylene-6α,9α-difluoro-16α-methyl-$\Delta^4$-pregnene-11β,17α,21-triol-3,20-dione;
1α,2α-methylene-6α-fluoro-16β-methyl-$\Delta^4$-pregnene-11β,17α,21-triol-3,20-dione;
1α,2α-methylene-9α-fluoro-16β-methyl-$\Delta^4$-pregnene-11β,17α,21-triol-3,20-dione;
1α,2α-methylene-6α,9α-difluoro-16β-methyl-$\Delta^4$-pregnene-11β,17α,21-triol-3,20-dione;
1α,2α-methylene-6α-methyl-$\Delta^4$-pregnene-11β,17α,21-triol-3,20-dione;
1α,2α-methylene-6α,16α-dimethyl-$\Delta^4$-pregnene-11β,17α,21-triol-3,20-dione;
1α,2α-methylene-9α-fluoro-16α-methyl-$\Delta^4$-pregnene-11β,17α,21-triol-3,20-dione;
1α,2α-methylene-9α-fluoro-$\Delta^4$-pregnene-11β,17α,21-triol-3,20-dione;
1α,2α-methylene-16α-methyl-$\Delta^4$-pregnene-11β,17α,21-triol-3,20-dione;
1α,2α-methylene-16β-methyl-$\Delta^4$-pregnene-11β,17α,21-triol-3,20-dione;
1α,2α-methylene-16α-fluoro-$\Delta^4$-pregnene-11β,17α,21-11β,17α,21-triol-3,20-dione;
1α,2α-methylene-9α,16α-difluoro-$\Delta^4$-pregnene-11β,17α,21-triol-3,20-dione;
1α,2α-methylene-16-chloro-$\Delta^4$-pregnene-11β,17α,21-triol-3,20-dione;
1α,2α-methylene-9α-fluoro-16α-chloro-$\Delta^4$-pregnene-11β,17α,21-triol-3,20-dione;
1α,2α-methylene-$\Delta^4$-pregnene-11β,17α,21-triol-3,20-dione;
1α,2α-methylene-$\Delta^4$-pregnene-17α,21-diol-3,20-dione; and
1α,2α-methylene-$\Delta^4$-pregnene-17α,21-diol-3,11,20-trione.

*Example 6*

A mixture of 1 g. of 1α,2α-difluoromethylene-9α-fluoro-$\Delta^4$-pregnene-11β,17α,21-triol-3,20-dione, 4 ml. of pyridine and 2 ml. of acetic anhydride is allowed to stand at room temperature for 15 hours. The mixture is then poured into ice water and the solid which forms is collected by filtration, washed with water and dried to yield 1α,2α-difluoromethylene-9α-fluoro-21-acetoxy-$\Delta^4$-pregnene-11β,17α-diol-3,20-dione which may be further purified through recrystallization from acetone:hexane.

To a suspension of 1 g. of 1α,2α-difluoromethylene-9α-fluoro-21-acetoxy-$\Delta^4$-pregnene-11β,17α-diol-3,20-dione in 27 ml. of methanol and 1 ml. of water, under nitrogen, is added 1.4 g. of semi-carbazide hydrochloride and 0.74 g. of sodium bicarbonate. The mixture is heated at reflux for three hours and then at 45° C. for 20 hours. The suspension is cooled and 36 ml. of water are slowly added to it. The solid is collected by filtration, washed with water and dried to yield 1α,2α-difluorommethylene-9α-fluoro-21-acetoxy-$\Delta^4$-pregnene-11β,17α-diol-3,20-bis semicarbazone which is rescrystallized from pyridine:methanol.

A solution of 1 g. of 1α,2α-difluoromethylene-9α-fluoro-21-acetoxy-$\Delta^4$-pregnene-11β,17α-diol-3,20-bis semicarbazone in 20 ml. of acetic acid and 1 ml. of acetic anhydride is heated at reflux under nitrogen for 1 hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for two hours and is then diluted with water and extracted with chloroform. These extracts are washed with water, dilute potassium bicarbonate solution and water, dried over magnesium sulfate and evaporated to dryness under reduced pressure. The residue is chromatographed on neutral alumina with benzene to yield 1α,2α-difluoromethylene-9α - fluoro - 21-acetoxy-$\Delta^{4,16}$-pregnadien-11β-ol-3,20-dione which may be recrystallized from acetone:ether.

A solution of 1 g. of 1α,2α-difluoromethylene-9α-fluoro-21-acetoxy-$\Delta^{4,16}$-pregnadien-11β-ol-3,20-dione in 30 ml. of ethereal solution of diazomethane is allowed to stand at room temperature for 24 hours. One milliliter of acetic acid is then added to the mixture which is then evaporated to dryness under reduced pressure. The residue is heated gradually to 180° C. in vacuo, cooled and recrystallized from acetone:hexane to yield 1α,2α-difluoromethylene-9α-fluoro - 16 - methyl-21-acetoxy-$\Delta^{4,16}$-pregnadien-11β-ol-3, 20-dione.

To a stirred solution of 5 g. of 1α,2α-difluoromethylene-9α - fluoro-16-methyl-21-acetoxy-$\Delta^{4,16}$-pregnadien-11β-ol-3,20-dione in 350 ml. of methanol is added 20 ml. of 4N aqueous sodium hydroxide and 20 ml. of 30% hydrogen peroxide, maintaining a temperature of approximately 15° C. The solution is allowed to stand at 0° C. for 15 hours and then poured into ice water. The solid which forms is collected by filtration, washed with water and dried, to yield 1α,2α - difluoromethylene-9α-fluoro-16α,17α-oxido-16β - methyl - 21 - acetoxy-$\Delta^4$-pregnen-11β-ol-3,20-dione which may be further purified by recrystallization from acetone:hexane.

To a solution of 1 g. of 1α,2α difluoromethylene-9α-fluoro - 16α,17α-oxido-16β-methyl-21-acetoxy-$\Delta^4$-pregnen-11β-ol-3,20-dione in 10 ml. of dioxane is added 0.5 ml. of a 50% w./v. solution of hydrogen bromide in acetic acid. After being allowed to stand for 10 minutes at room temperature, the mixture is poured into water and extracted with ether. These ethereal extracts are dried over sodium sulfate and evaporated to dryness to yield 1α,2α-difluoromethylene - 9α - fluoro-16-methylene-21-acetoxy-Δ⁴-pregnene-11β,17α-diol-3,20-dione.

A solution of 1 g. of 1α,2α-difluoromethylene-9α-fluoro-16 - methylene-21-acetoxy-Δ⁴-pregnene-11β,17α-diol-3,20-dione, in 50 ml. of methanol is heated at reflux for 1 hour with a solution of 1 g. of potassium carbonate in water. The reaction mixture is then poured into ice water and the solid collected by filtration, washed with water to neutrality and dried to yield 1α,2α-difluoromethylene-9α-fluoro-16-methylene-Δ⁴-pregnane-11β,17α,21-triol-3,20-dione which is recrystallized from methylene chloride:ether.

*Example 7*

A mixture of 1 g. of 1α,2α-difluoromethylene-17α,20;20,21-bis methylenedioxy-Δ⁴-pregnen-11β-ol-3-one, 1.5 ml. of ethylorthoformate, 70 mg. of 2,4-dinitrobenzenesulfonic acid and 6 ml. of dioxane are stirred at room temperature for 7 hours. At the end of this time, the mixture is neutralized with pyridine and concentrated to remove the dioxane. The residue is partitioned between methylene chloride and aqueous potassium bicarbonate solution, separated and the organic phase washed with saturated aqueous sodium chloride solution, dried over sodium sulfate and evaporated to yield 1α,2α-difluoromethylene-3-ethoxy-17α,20;20,21-bis methylenedioxy-Δ³,⁵,(⁶)-pregnadien-11β-ol. This material is dissolved in 8 ml. of 80% ethanol and 0.4 g. of sodium acetate are added. The suspension is cooled to 0° C. adding up to 10% methylene chloride as necessary to prevent precipitation, and 0.84 g. of N-bromosuccinimide is then added. The mixture is stirred for 30 minutes at 0° C. and then concentrated under reduced pressure. The residue is partitioned between water and methylene chloride, the phases are separated and the organic phase is washed with water and saturated aqueous sodium chloride solution, dried and evaporated to dryness under reduced pressure. The residue is dissolved in 20 ml. of dimethylacetamide and this solution is added rapidly to a stirred boiling suspension of 2 g. of calcium carbonate in 100 ml. of dimethylacetamide under nitrogen. The mixture is refluxed for 90 minutes and then evaporated to dryness. The residue is extracted with methylene chloride and these extracts are chromatographed on alumina, eluting with 5% ethyl acetate in methylene chloride to yield 1α,2α-difluoromethylene-17α,20;20,21-bis methylenedioxy-Δ⁴,⁶-pregnadien-11β-ol-3-one.

A suspension of 1 g. of 1α,2α-difluoromethylene-17α,20;20,21-bis methylenedioxy-Δ⁴,⁶-pregnadien-11β-ol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 1α,2α-difluoromethylene-Δ⁴,⁶-pregnadiene-11β,17α,21-triol-3,20-dione which may be further purified through recrystallization from isopropanol.

In a similar fashion the following compounds are prepared:

1α,2α-methylene-Δ⁴,⁶-pregnadiene-11β,17α,21-triol-3,20-dione;
1α,2α-difluoromethylene-9α-fluoro-Δ⁴,⁶-pregnadiene-11β,17α,21-triol-3,20-dione;
1α,2α,difluoromethylene-16α-methyl-Δ⁴,⁶-pregnadiene-11β,17α,21-triol-3,20-dione;
1α,2α-difluoromethylene-9α-fluoro-16α-methyl-Δ⁴,⁶-pregnadiene-11β,17α,21-triol-3,20-dione;
1α,2α-difluoromethylene-16β-methyl-Δ⁴,⁶-pregnadiene-11β,17α,21-triol-3,20-dione;
1α,2α-difluoromethylene-9α-fluoro-16α-methyl-Δ⁴,⁶-pregnadiene-11β-17α,21-triol-3,20-dione;
1α,2α-difluoromethylene-16α,-fluoro-Δ⁴,⁶-pregnadiene-11β,17α,21-triol-3,20-dione;
1α,2α-difluoromethylene-9α,16α-difluoromethylene-Δ⁴,⁶-pregnadiene-11β,17α,21-triol-3,20-dione;
1α,2α-difluoromethylene-16α-chloro-Δ⁴,⁶-pregnadiene-11β,17α,21-triol-3,20-dione;
1α,2α-difluoromethylene-9α-fluoro-16α-fluoro-Δ⁴,⁶-pregnadiene-11β,17α,21-triol-3,20-dione;
1α,2α-methylene-9α-fluoro-Δ⁴,⁶-pregnadiene-11β,17α,21-triol-3,20-dione;
1α,2α-methylene-16α-methyl-Δ⁴,⁶-pregnadiene-11β,17α,21-triol-3,20-dione;
1α,2α-methylene-9α-fluoro-16α-methyl-Δ⁴,⁶-pregnadiene-11β,17α,21-triol-3,20-dione;
1α,2α-methylene-16β-methyl-Δ⁴,⁶-pregnadiene-11β,17α,21-triol-3,20-dione;
1α,2α-methylene-9α-fluoro-16β-methyl-Δ⁴,⁶-pregnadiene-11β,17α,21-triol-3,20-dione;
1α,2α-methylene-16α-fluoro-Δ⁴,⁶-pregnadiene-11β,17α,21-triol-3,20-dione;
1α,2α-methylene-9α,16α-difluoro-Δ⁴,⁶-pregnadiene-11β,17α,21-triol-3,20-dione;
1α,2α-methylene-16α-chloro-Δ⁴,⁶-pregnadiene-11β-17α,21-triol-3,20-dione; and
1α,2α-methylene-9α-fluoro-16α-fluoro-Δ⁴,⁶-pregnadiene-11β,17α,21-triol-3,20-dione.

Alternatively the above compounds may be prepared in the following manner:

A mixture of 1 g. of 1α,2α-difluoromethylene-6α,16α-dimethyl - 17α,20;20,21-bis methylenedioxy-Δ⁴-pregnen-11β-ol-3-one, 2 g. of chloranil, and 10 ml. of xylene is refluxed under an atmosphere of nitrogen for 16 hours. The mixture is cooled, washed with a cold 10% sodium hydroxide solution and then with water, dried over sodium sulfate and evaporated under reduced pressure. The residue is chromatographed on neutral alumina and further purified through recrystallization from acetone:hexane to yield 1α,2α-difluoromethylene-6,16α-methyl-17α,20;20,21-bis methylenedioxy-Δ⁴,⁶-pregnadien-11β-ol-3-one.

A suspension of 1 g. of 1α,2α-difluoromethylene-6,16α-dimethyl - 17α,20;20,21 - bis methylenedioxy-Δ⁴,⁶-pregnadien-11β-ol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 1α,2α-difluoromethylene - 6,16α - dimethyl - Δ⁴,⁶ - pregnadiene-11β,17α,21-triol-3,20-dione which may be further purified through recrystallization from isopropanol.

In a similar fashion, the following compounds may be obtained:

1α,2α-difluoromethylene-6-chloro-Δ⁴,⁶-pregnadiene-11β,17α,21-triol-3,20-dione;
1α,2α-difluoromethylene-6-chloro-16α-methyl-Δ⁴,⁶-pregnadiene-11β,17α,21-triol-3,20-dione;
1α,2α-difluoromethylene-6-fluoro-Δ⁴,⁶-pregnadiene-11β,17α,21-triol-3,20-dione;
1α,2α-difluoromethylene-6-fluoro-16α-methyl-Δ⁴,⁶-pregnadiene-11β,17α,21-triol-3,20-dione;
1α,2α-difluoromethylene-6-chloro-16β-methyl-Δ⁴,⁶-pregnadiene-11β,17α,21-triol-3,20-dione;
1α,2α-difluoromethylene-6-chloro-Δ⁴,⁶-pregnadiene-17α,21-diol-3,20-dione;
1α,2α-methylene-6-chloro-Δ⁴,⁶-pregnadiene-11β,17α,21-triol-3,20-dione;
1α,2α-methylene-6-chloro-16α-methyl-Δ⁴,⁶-pregnadiene-11β,17α,21-triol-3,20-dione;
1α,2α-methylene-6-fluoro-Δ⁴,⁶-pregnadiene-11β,17α,21-triol-3,20-dione;
1α,2α-methylene-6-fluoro-16α-methyl-Δ⁴,⁶-pregnadiene-11β,17α,21-triol-3,20-dione;
1α,2α-methylene-6-chloro-16β-methyl-Δ⁴,⁶-pregnadiene-11β,17α,21-triol-3,20-dione; and
1α,2α-methylene-6-chloro-Δ⁴,⁶-pregnadiene-17α,21-diol-3,20-dione.

Example 8

To a cooled solution (0° C.) of 3.4 g. of 1α,2α-difluoromethylene - 9α - fluoro-16α-methyl - Δ⁴ - pregnene-11β,17α,21-triol-3,20-dione in 20 ml. of 9:1 chloroform:pyridine is added in small portions 1.4 g. of methanesulfonyl chloride. The reaction mixture allowed to stand for 14 hours at 0° C. and is then washed with dilute hydrochloric acid, water and sodium bicarbonate solution. The chloroform removed by evaporation under reduced pressure and the residue is dissolved in 20 ml. of acetone treated at room temperature and under stirring with 4 g. of sodium iodide. Sodium thiosulfate solution is added to decolorize the mixture, followed by the addition of water. The solid which forms is collected by filtration and dried in vacuum to yield 1α,2α-difluoromethylene - 9α - fluoro-16α - methyl-21-iodo-Δ⁴-pregnene-11β,17α-diol-3,20-dione. This material is dissolved in 20 ml. of acetonitrile and treated dropwise with 1.4 g. of silver fluoride in 3 ml. of water. The mixture is allowed to stand at room temperature for 24 hours and then filtered. The filtrate is concentrated under vacuum and the solid which forms is collected and dried to yield 1α,2α-difluoromethylene - 9α,21 - difluoro-16α-methyl-Δ⁴-pregnene-11β,17α-diol-3,20-dione which is recrystallized from methanol:acetone.

Example 9

A mixture of 1 g. of 1α,2α-difluoromethylene-9α-fluoro-16α-methyl-21-iodo-Δ⁴-pregnene - 11β,17α - diol - 3,20-dione and 1.1 molar equivalents of silver monobasic phosphate in 60 ml. of acetonitrile is heated at reflux for 2 hours. The mixture is then filtered and evaporated to dryness to yield 1α,2α-difluoromethylene - 9α - fluoro-16α-methyl-21-phosphato - Δ⁴ - pregnene - 11β,17α-diol-3,20-dione which may be recrystallized from methanol:ethyl acetate. This product, dissolved in methanol may be tritrated with aqueous sodium hydroxide to yield the corresponding monosodium and disodium salts.

Example 10

A mixture of 1.34 g. of 1α,2α-difluoromethylene-Δ⁴-pregnene-17α,21-diol-3,20-dione, 0.38 ml. of methanesulfonyl chloride and 10 ml. of pyridine is allowed to stand at room temperature for 16 hours and is then poured into ice water and extracted with methylene chloride. The extracts are washed with 2N hydrochloric acid, aqueous potassium bicarbonate solution and saturated aqueous sodium chloride solution, dried over magnesium sulfate and evaporated to dryness. The residue is heated with 3.6 g. of sodium iodide and 150 ml. of acetone at boiling for 40 minutes and then evaporated under reduced pressure. The residue is extracted with methylene chloride and these extracts are washed with saturated aqueous sodium chloride, dried over magnesium sulfate and evaporated to dryness. A suspension of the residue and 2.6 g. of sodium metabisulfite in 300 ml. of 80% of aqueous ethanol is heated at reflux for one hour and then evaporated under reduced pressure at a temperature below 45° C. The residue is partitioned between water and methylene chloride, the phases are separated aqueous sodium chloride solution, dried and evaporated to dryness to yield 1α,2α-difluoromethylene-Δ⁴-pregnen-17α-ol-3,20-dione which may be recrystallized from acetone.

In a similar fashion the following compounds are obtained according to the procedure of this example:

1α,2α-methylene-Δ⁴-pregnen-17α-ol-3,20-dione;
1α,2α-difluoromethylene-16α-methylene-Δ⁴-pregnen-17α-ol-3,20-dione; and
1α,2α-methylene-16-methylene-Δ⁴-pregnen-17α-ol-3,20-dione.

Example 11

A mixture of 1 g. of 1α,2α-difluoromethylene-Δ⁴-pregnen-17α-ol-3,20-dione, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 1α,2α-difluoromethylene-17α-acetoxy-Δ⁴-pregnene-3,20-dione which is recrystallized from acetone:ether.

A mixture of 1 g. of 1α,2α-difluoromethylene-17α-acetoxy-Δ⁴-pregnen-3,20-dione, 1.5 ml. of ethylorthoformate, 70 mg. of 2,4-dinitrobenzenesulfonic acid and 6 ml. of dioxane are stirred at room temperature for 7 hours. At the end of this time, the mixture is neutralized with pyridine and concentrated to remove the dioxane. The residue is partitioned between methylene chloride and aqueous potassium bicarbonate solution, separated and the organic phase washed with saturated aqueous sodium chloride solution, dried over sodium sulfate and evaporated to yield 1α,2α-difluoromethylene - 3 - ethoxy - 17α - acetoxy-Δ³,⁵⁽⁶⁾-pregnadien-20-one. This material is dissolved in 8 ml. of 80% ethanol and 0.4 g. of sodium acetate are added. The suspension is cooled to 0° C. adding up to 10% methylene chloride as necessary to prevent precipitation, and 0.84 g. of N-bromosuccinimide is then added. The mixture is stirred for 30 minutes at 0° C. and then concentrated under reduced pressure. The residue is partitioned between water and methylene chloride, the phases are separated and the organic phase is washed with water and saturated aqueous sodium chloride solution, dried and evaporated to dryness under reduced pressure. The residue is dissolved in 20 ml. of dimethylacetamide and this solution is added rapidly to a stirred boiling suspension of 2 g. of calcium carbonate in 100 ml. of dimethylacetamide under nitrogen. The mixture is refluxed for 90 minutes and then evaporated to dryness. The residue is extracted with methylene chloride and these extracts are chromatographed on alumina, eluting with 5% ethyl acetate in methylene chloride to yield 1α,2α-difluoromethylene-17α-acetoxy-Δ⁴,⁶-pregnadiene-3,20-dione.

In a similar fashion, 1α,2α-difluoromethylene-16α-methyl-17α-acetoxy-Δ⁴,⁶-pregnadiene - 3,20 - dione; 1α,2α-methylene - 17α - acetoxy-Δ⁴,⁶-pregnadiene-3,20-dione; and 1α,2α-methylene-16α-methyl-17α-acetoxy-Δ⁴,⁶ - pregnadiene-3,20-dione are obtained according to the procedure of this example.

Example 12

To a solution of 0.1 g. of 1α,2α-difluoromethylene-17α-acetoxy-Δ⁴,⁶-pregnadien-3,20-dione in 2.5 ml. of methylene chloride, cooled to −10° C. is added 0.5 ml. of freshly distilled chromyl chloride. The temperature of the mixture is allowed to reach 0° C. and is held at this level for 3½ hours. At the end of this time, excess reagent is decomposed by the addition of aqueous sodium metasulfite. The aqueous layer is extracted with methylene chloride and the combined extracts and organic layer are washed with aqueous potassium bicarbonate and aqueous saturated sodium chloride solution, dried and evaporated to dryness. The residue is added to 10 ml. of glacial acetic acid which is saturated with dry hydrogen chloride and this mixture is heated at reflux for 2 hours. The acetic acid is then removed under reduced pressure and the residue is partitioned between methylene chloride and aqueous potassium bicarbonate solution. The organic layer is washed with saturated aqueous sodium chloride solution, dried and evaporated to dryness. This residue is then chromatographed on alumina, eluting with 2% ethyl acetate in methylene chloride to yield 1α,2α-difluoromethyl-6-chloro-17α-acetoxy-Δ⁴,⁶-pregnadiene-3,20-dione.

In a similar fashion the following compounds are obtained:

1α,2α-difluoromethylene-6-chloro-16α-methyl-17α-acetoxy-Δ⁴,⁶-pregnadiene-3,20-dione;
1α,2α-methylene-6-chloro-17α-acetoxy-Δ⁴,⁶-pregnadiene-3,20-dione; and
1α,2α-methylene-6-chloro-16α-methyl-17α-acetoxy-Δ⁴,⁶-pregnadiene-3,20-dione.

Example 13

To a suspension of 1 g. of 1α,2α-difluoromethylene-Δ⁴-pregnen-17α-ol-3,20-dione in 27 ml. of methanol and 1 ml. of water, under nitrogen, is added 1.4 g. of semicarbazide hydrochloride and 0.74 g. of sodium bicarbonate. The mixture is heated at reflux for three hours and then at 45° C. for 20 hours. The suspension is cooled and 36 ml. of water are slowly added to it. The solid is collected by filtration, washed with water and dried to yield 1α,2α-difluoromethylene-Δ⁴-pregnen-17α-ol-3,20-bis semicarbazone which is recrystallized from pyridine:methanol.

A solution of 1 g. of 1α,2α-difluoromethylene-Δ⁴-pregnen-17α-ol-3,20-bis semicarbazone in 20 ml. of acetic acid and 1 ml. of acetic anhydride is heated at reflux under nitrogen for 1 hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for 2 hours and is then diluted with water and extracted with chloroform. These extracts are washed with water, dilute potassium bicarbonate solution and water, dried over magnesium sulfate and evaporated to dryness under reduced pressure. The residue is chromatographed on neutral alumina with benzene to yield 1α,2α-difluoromethylene-Δ$^{4,16}$-pregnadiene-3,20-dione which may be recrystallized from acetone:ether.

A solution of 1 g. of 1α,2α-difluoromethylene-Δ$^{4,16}$-pregnadiene-3,20-dione in 30 ml. of an ethereal solution of diazomethane is allowed to stand at room temperature for 24 hours. One milliliter of acetic acid is then added to the mixture which is then evaporated to dryness under reduced pressure. The residue is heated gradually to 180° C. in vacuo, cooled and recrystallized from acetone:hexane to yield 1α,2α-difluoromethylene-16-methyl-Δ$^{4,16}$-pregnadiene-3,20-dione.

A solution of 2.5 g. of 1α,2α-difluoromethylene-16-methyl-Δ$^{4,16}$-pregnadiene-3,20-dione in 100 ml. of chloroform is cooled to 0° C. and mixed with a solution of 1.1 molar equivalents of monoperphthalic acid in ether. The mixture is allowed to stand at room temperature for 20 hours and then diluted with water. The organic layer is separated, washed with aqueous sodium bicarbonate solution and then with water to neutrality, dried over sodium sulfate and evaporated to dryness to yield 1α,2α-difluoromethylene-16α,17α-oxido-16β-methyl-Δ⁴-pregnene-3,20-dione.

To a solution of 1 g. of 1α,2α-difluoromethylene-16α,17α-oxido-16β-methyl-Δ⁴-pregnene-3,20-dione in 10 ml. of dioxane is added 0.5 ml. of a 50% w./v. solution of hydrogen bromide in acetic acid. After being allowed to stand for 10 minutes at room temperature, the mixture is poured into water and extracted with ether. These ethereal extracts are dried over sodium sulfate and evaporated to dryness to yield 1α,2α-difluoromethylene-16-methylene-Δ⁴-pregnen-17α-ol-3,20-dione, which may be recrystallized from acetone:hexane.

Example 4

To a stirred solution of 1 g. of 17α,20;20,21-bis methylenedioxy-Δ¹-5α-pregnen-3-one, prepared in the manner of Example 1, in 10 ml. of dimethyl triethylene glycol ether, is added in a dropwise fashion and under nitrogen, a 50% w./v. solution of sodium trichloroacetate. When the addition of 5 equivalents of reagent fails to produce an appreciable change in the U.V. spectrum, the addition is stopped. The solution is cooled and filtered and the filtrate is evaporated to dryness under reduced pressure. The residue thus obtained is chromatographed on alumina, eluting with methylene chloride, to yield 1α,2α-dichloromethylene-17α,20;20,21-bis methylenedioxy-5α-pregnan-3-one.

To a stirred solution of 1 g. of 1α,2α-dichloromethylene-17α,20;20,21-bis methylenedioxy-5α-pregnan-3-one and 6.6 g. of p-toluenesulfonic acid in 330 ml. of glacial acetic acid is added, over a 10 minute period, a solution of 1.1 molar equivalent of bromine and 2.45 g. of sodium acetate in 110 ml. of glacial acetic acid. After stirring for an additional 10-minute period, a solution of 75 g. of sodium acetate in 150 ml. of glacial acetic acid is added and stirring is then continued at 20° C. for 5 minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with 3:1 benzene:chloroform to yield 1α,2α-dichloromethylene-17α,20;20,21-bis methylenedioxy-Δ⁴-pregnen-3-one which may be recrystallized from cyclohexane:ethyl acetate.

A suspension of 1 g. of 1α,2α-dichloromethylene-17α,20;20,21-bis methylenedioxy-Δ⁴-pregnen-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexene:ethyl acetate to yield 1α,2α-dichloromethylene-Δ⁴-pregnene-17α,21-diol-3,20-dione which may be further purified through recrystallization from isopropanol.

A mixture of 1.34 g. of 1α,2α-dichloromethylene-Δ⁴-pregnen-17α-ol-3,20-dione, 0.38 ml. of methanesulfonyl chloride and 10 ml. of pyridine is allowed to stand at room temperature for 16 hours and is then poured into ice water and extracted with methylene chloride. The extracts are washed with 2 N hydrochloric acid, aqueous potassium bicarbonate solution, and saturated aqueous sodium chloride solution, dried over magnesium sulfate and evaporated to dryness. This residue and 3.6 g. of sodium iodide is added to 150 ml. of acetone, boiled for 40 minutes and evaporated to dryness under reduced pressure. The residue is extracted with methylene chloride. These extracts are washed with saturated aqueous sodium chloride solution, dried over magnesium sulfate and evaporated to dryness. A suspension of the residue and 2.6 g. of sodium metabisulfite in 300 ml. of 80% aqueous ethanol is heated at reflux for one hour and then evaporated under reduced pressure at a temperature below 45° C. The residue is partitioned between water and methylene chloride and the phases are then separated. The organic phase is washed with saturated aqueous sodium chloride solution, dried, and evaporated to dryness to yield 1α,2α-dichloromethylene-Δ⁴-pregnen-17α-ol-3,20-dione which may be further purified through recrystallization from acetone:hexane.

A mixture of 1 g. of 1α,2α-dichloromethylene-Δ⁴-pregnen-17α-ol-3,20-dione, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 1α,2α-dichloromethylene-17α-acetoxy-Δ⁴-pregnene-3,20-dione which is recrystallized from acetone:ether.

Example 15

A solution of 1 g. of 1α,2α-dichloromethylene-17α,20;20,21-bis methylenedioxy-Δ⁴-pregnen-3-one in anhydrous ethyl ether is stirred under nitrogen for 48 hours with a molar excess of lithium aluminum hydride. At the end of this time, the mixture is cautiously treated with 2 ml. of ethyl acetate and 1 ml. of water. The solid collected upon filtration is washed well with hot ethyl acetate and the resulting organic solution are dried over sodium sulfate and evaporated to dryness. The residue, dissolved in dioxane, is mixed with 1.1 molar equivalents of 2,3-dichloro-5,6-dicyano-1,4-benzoquinone and allowed to stand for 3 hours at 25° C. The solution is then filtered and evaporated to dryness. The residue thus obtained is dissolved in acetone and filtered through alumina to yield, after evaporation of the solvent, 1α,2α-methylene-17α,20; 20,21-bis methylenedioxy-Δ⁴-pregnen-3-one which is converted to 1α,2α-methylene-17α-acetoxy-Δ⁴-pregnene-3,20-dione in the same manner as described in Example 14 for the corresponding 1α,2α-dichloromethylene compound.

*Example 16*

To a mixture of 700 mg. of 1α,2α-difluoromethylene-9α-fluoro-16β-methyl - Δ⁴ - pregnene-11β,17α,21-triol-3,20-dione, 7 ml. of dry dimethyl formamide and 1.4 ml. of ethyl orthovalerate are added 10 mg. of dry p-toluenesulfonic acid. The reaction mixture is heated at reflux for one hour and then poured into an aqueous solution of sodium bicarbonate. This mixture is extracted with benzene and these extracts are evaporated to dryness to yield 1α,2α - difluoromethylene - 9α - fluoro - 16β - methyl-17α,21 - (1 - methoxypent - 1,1-ylidenedioxy) - Δ⁴ - pregnen - 11β - ol - 3,20 - dione which is separated into its diastereoisomers through chromatography over alumina.

In a similar fashion the various other 17α,21-dihydroxy compounds of the present invention may be treated with the above orthoester or other orthoesters such as ethyl orthoformate, methyl orthocaproate, and the like.

*Example 17*

To an ethereal solution of 1α,2α - difluoromethylene-9α - fluoro - 16β - methyl - 17α,21 - (1 - methoxypent - 1, 1 - ylidenedioxy) - Δ⁴ - pregnen - 11β - ol - 3,20-dione is treated with a few drops of concentrated hydrochloric acid. The mixture is allowed to stand for one hour and is then washed with water, dried over sodium sulfate and evaporated to dryness to yield 1α,2α - difluoromethylene-9α - fluoro - 16β - methyl - 17α - pentanoyloxy - Δ⁴ - pregnene - 11β,21 - diol - 3,20 - dione, which is further purified through recrystallization from acetone:hexane.

1α,2α - methylene - 9α - fluoro - 16β - methyl - 17α-pentanoyloxy - Δ⁴ - pregnene - 11β,21 - diol - 3,20-dione is prepared in a similar fashion from the corresponding 17α,21 - (1 - methoxypent - 1,1 - ylidenedioxy) derivative, obtained according to the procedure of Example 16.

*Example 18*

A mixture of 2 g. of 1α,2α - difluoromethylene - 9α-fluoro - 16α - methyl - Δ⁴ - pregnene - 11β,17α,21 - diol-3,20 - dione, 8 ml. of pyridine and 4 ml. of trimethylacetyl chloride is heated at steam bath temperature for one hour. The mixture is then poured into ice water and the solid which forms is collected by filtration, washed with water and dried to yield 1α,2α - difluoromethylene - 9α - fluoro-16α - methyl - 21 - trimethylacetoxy - Δ⁴ - pregnene - 11β, 17α - diol - 3,20 - dione which may be recrystallized from methylene chloride:hexane.

What is claimed is:
1. Compounds of the formula:

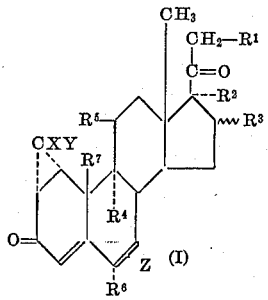

wherein R¹ is hydrogen, hydroxy, fluoro, chloro, phosphato, tetrahydropyranyloxy, a hydrocarbon carboxylic acyloxy group of less than 12 carbon atoms, or when taken together with R² the group

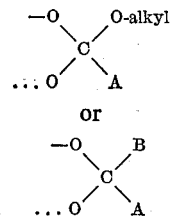

or

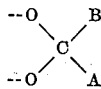

in which A is hydrogen or alkyl of up to 8 carbon atoms and B is hydrogen or alkyl or acyl of up to 8 carbon atoms; R² is hydrogen, hydroxy, a hydrocarbon carboxylic acyloxy group of less than 12 carbon atoms or when taken together with R³ the group

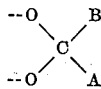

R³ is hydrogen, methylene, α-methyl, β-bethyl, α-chloro, α-fluoro,α-hydroxy or an α-hydrocarbon carboxylic acyloxy group of less than 12 carbon atoms;
R⁴ is hydrogen, chloro or fluoro;
R⁵ is hydrogen, hydroxy, keto or chloro, R⁴ and R⁵ being the same when R⁵ is hydrogen or chloro;
R⁶ is hydrogen, methyl, chloro or fluoro;
R⁷ is hydrogen or methyl;
Z is a carbon-carbon single bond or a carbon-carbon double bond; and
each of X and Y is hydrogen, chloro or fluoro, at least one of X and Y being chloro or fluoro.

2. Compounds according to claim 1 wherein each of X and Y is fluoro.

3. Compounds of formula:

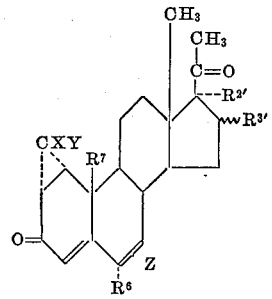

wherein R²′ is hydrogen, hydroxy or a hydrocarbon carboxylic acyloxy group of less than 12 carbon atoms;
R³′ is hydrogen, methylene or α-methyl;
R⁶ is hydrogen, methyl, chloro or fluoro;
R⁷ is hydrogen or methyl;
Z is a carbon-carbon single bond or a carbon-carbon double bond; and
each of X and Y is hydrogen, chloro or fluoro, at least one of X and Y being chloro or fluoro.

4. Compounds according to claim 3 wherein each of X and Y is fluoro.

5. Compounds of the formula:

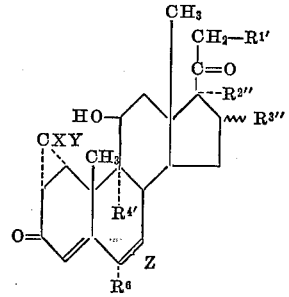

wherein R$^{1\prime}$ is hydroxy or a hydrocarbon carboxylic acyloxy group;

R$^{2\prime\prime}$ is hydrogen, hydroxy or taken together with R$^{3\prime\prime}$ the group

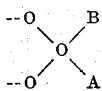

in which A is hydrogen or alkyl and B is hydrogen, or alkyl or aryl of up to 8 carbon atoms;

R$^{3\prime\prime}$ is hydrogen, α-methyl, β-methyl or hydroxy; and

R$^{4\prime}$ is hydrogen or fluoro;

R$^6$ is hydrogen, methyl, chloro or fluoro;

Z is a carbon-carbon single bond or a carbon-carbon double bond; and each of X and Y is hydrogen, chloro or fluoro, at least one of X and Y being chloro or fluoro.

6. Compound according to claim 5 wherein each of X and Y is fluoro.

7. 1α,2α - difluoromethylene - 6α,9α - difluoro - 16α,17α - isopropylidenedioxy - Δ$^4$ - pregnene - 11β,21 - diol - 3,20 - dione and the 21-esters thereof with hydrocarbon carboxylic acids of less than 12 carbon atoms.

8. 1,2α - difluoromethylene - 6α - fluoro - 16α,17α - isopropylidenedioxy - Δ$^4$ - pregnene - 11β,21 - diol - 3,20 - dione and the 21-esters thereof with hydrocarbon carboxylic acids of less than 12 carbon atoms.

9. 1α,2α - difluoromethylene - 6α,9α - difluoro - 16α - methyl - Δ$^4$ - pregnene - 11β,17α,21 - triol - 3,20 - dione and the 21-esters thereof with hydrocarbon carboxylic acids of less than 12 carbon atoms.

10. 1α,2α - difluoromethylene - 6α - fluoro - 16α - methyl - Δ$^4$ - pregnene - 11β,17α,21 - triol - 3,20 - dione and the 21-esters thereof with hydrocarbon carboxylic acids of less than 12 carbon atoms.

11. 1α,2α - difluoromethylene - 6,16α - dimethyl - Δ$^{4,6}$ - pregnadiene - 11β,17α,21 - triol - 3,20 - dione and the 21-esters thereof with hydrocarbon carboxylic acids of less than 12 carbon atoms.

12. 1α,2α - difluoromethylene - 6α - fluoro - 16α - methyl - Δ$^4$ - pregnene - 11β,21 - diol - 3,20 - dione and the 21-esters thereof with hydrocarbon carboxylic acids of less than 12 carbon atoms.

13. 1α,2α - difluoromethylene - 6α,9α - difluoro - 16α - methyl - Δ$^4$ - pregnene - 11β,21 - diol - 3,20 - dione and the 21-esters thereof with hydrocarbon carboxylic acids of less than 12 carbon atoms.

14. 1α,2α - difluoromethylene - 6 - chloro - 17α - acetoxy - Δ$^{4,6}$ - pregnadiene - 3,20 - dione.

15. 1α,2α - difluoromethylene - 6 - chloro - 16 - methylene - 17 - acetoxy - Δ$^{4,6}$ - pregnadiene - 3,20 - dione.

16. 1α,2α - difluoromethylene - 6 - chloro - 16α - methyl - 17α - acetoxy - Δ$^{4,6}$ - pregnadiene - 3,20 - dione.

No references cited.

LEWIS GOTTS, *Primary Examiner.*

HENRY A. FRENCH, *Assistant Examiner.*

UNITED STATES PATENT OFFICE
CERTIFICATE OF CORRECTION

Patent No. 3,338,893                             August 29, 1967

Colin C. Beard et al.

It is hereby certified that error appears in the above numbered patent requiring correction and that the said Letters Patent should read as corrected below.

Column 10, line 75, for "11β,17α,21-triol" read -- 17α,21-diol --; column 13, line 53, for "condition" read -- addition --; column 14, line 38, for "16β" read -- 16α --; line 70, for "-2,20-" read -- -3,20- --; column 15, line 63, for "-2,11-" read -- -3,11- --; column 16, line 50, for "11α" read -- 1α --; column 17, line 13, for "bromide" read -- bromine --; line 75, strike out "11β,17α,21-"; column 18, line 3, for "16" read -- 16α --; column 23, line 58, for "Example 4" read -- Example 14 --.

Signed and sealed this 29th day of October 1968.

(SEAL)
Attest:

Edward M. Fletcher, Jr.
Attesting Officer

EDWARD J. BRENNER
Commissioner of Patents